United States Patent
Jennings et al.

(10) Patent No.: US 12,454,315 B2
(45) Date of Patent: Oct. 28, 2025

(54) TEMPERATURE DEPENDENT ENHANCEMENT FOR BRAKE-TO-STEER

(71) Applicants: Steering Solutions IP Holding Corporation, Auburn Hills, MI (US); Continental Automotive Systems, Inc., Auburn Hills, MI (US)

(72) Inventors: Alex Jennings, Bath, MI (US); Sarin Kodappully, Midland, MI (US); Michael S. Wyciechowski, Grand Blanc, MI (US); Iulian Ungureanu, Oakland Township, MI (US)

(73) Assignees: Steering Solutions IP Holding Corporation, Auburn Hills, MI (US); Continental Automotive Systems Inc., Auburn Hills, MI (US)

( * ) Notice: Subject to any disclaimer, the term of this patent is extended or adjusted under 35 U.S.C. 154(b) by 355 days.

(21) Appl. No.: 18/122,170

(22) Filed: Mar. 16, 2023

(65) Prior Publication Data

US 2024/0308584 A1    Sep. 19, 2024

(51) Int. Cl.

| | |
|---|---|
| *B60T 8/172* | (2006.01) |
| *B60T 17/22* | (2006.01) |
| *B60W 10/04* | (2006.01) |
| *B60W 10/18* | (2012.01) |
| *B60W 10/20* | (2006.01) |
| *B60W 30/18* | (2012.01) |
| *B62D 9/00* | (2006.01) |
| *F16D 66/00* | (2006.01) |

(52) U.S. Cl.
CPC ............. *B62D 9/005* (2013.01); *B60T 8/172* (2013.01); *B60T 8/1725* (2013.01); *B60T 17/22* (2013.01); *B60W 10/04* (2013.01); *B60W 10/18* (2013.01); *B60W 10/20* (2013.01); *B60W 30/18145* (2013.01); *B60W 2510/184* (2013.01); *B60W 2710/18* (2013.01); *B60W 2710/184* (2013.01); *B60W 2710/20* (2013.01); *F16D 2066/001* (2013.01)

(58) Field of Classification Search
CPC ............................. B60T 8/172; B60T 8/1725; B60W 2510/184; B60W 2710/18; B60W 2710/184; B60W 2710/20; B62D 9/005; F16D 2066/001; F16D 2066/006
USPC ...................... 701/41, 43, 70, 72, 76, 78, 79
See application file for complete search history.

(56) References Cited

U.S. PATENT DOCUMENTS

| | | |
|---|---|---|
| 10,046,743 B2 | 8/2018 | Jonasson et al. |
| 10,046,749 B2 | 8/2018 | Irwan et al. |
| (Continued) | | |

FOREIGN PATENT DOCUMENTS

| | | |
|---|---|---|
| DE | 102021125892 A1 | 4/2022 |
| DE | 102021122051 A1 | 3/2023 |

OTHER PUBLICATIONS

DE Office action dated Jan. 8, 2024 for CN application No. 10 2023 113 770.0.

*Primary Examiner* — Erick R Solis
(74) *Attorney, Agent, or Firm* — Ingrassia Fisher & Lorenz, LLP

(57) ABSTRACT

A number of variations are disclosed including a computer program product and method of modifying brake-to-steer brake pressure commands, based on brake temperature, in real time as well as to create temperature dependent powertrain control and temperature dependent brake cooling.

20 Claims, 2 Drawing Sheets

(56) References Cited

U.S. PATENT DOCUMENTS 11,565,699 B1\* 1/2023 Ravella ........... B60W 30/18127
2024/0262419 A1\* 8/2024 Luelfing ............... B60T 8/1755

\* cited by examiner

TEMPERATURE DEPENDENT ENHANCEMENT FOR BRAKE-TO-STEER

TECHNICAL FIELD

The field to which the disclosure generally relates to includes steering, braking, and propulsion systems.

BACKGROUND

Vehicles typically include steering systems including electric power steering systems and electronic braking systems.

SUMMARY OF ILLUSTRATIVE VARIATIONS

A number of variations may include a system and method for modifying braking commands, via instructions communicated from at least one electronic processor, to increase lateral capability of a vehicle based on real-time brake temperature estimates or measurements.

Brake temperature inputs, measured or estimated based on several factors such as, but not limited to, sensors including temperature sensors, brake pressure apply time, brake force apply time, wheel deceleration, or vehicle deceleration, may be utilized to modify brake-to-steer brake pressure commands in real time as well as to create temperature dependent powertrain control, temperature dependent brake control, and brake temperature regulation.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

Figure 1:
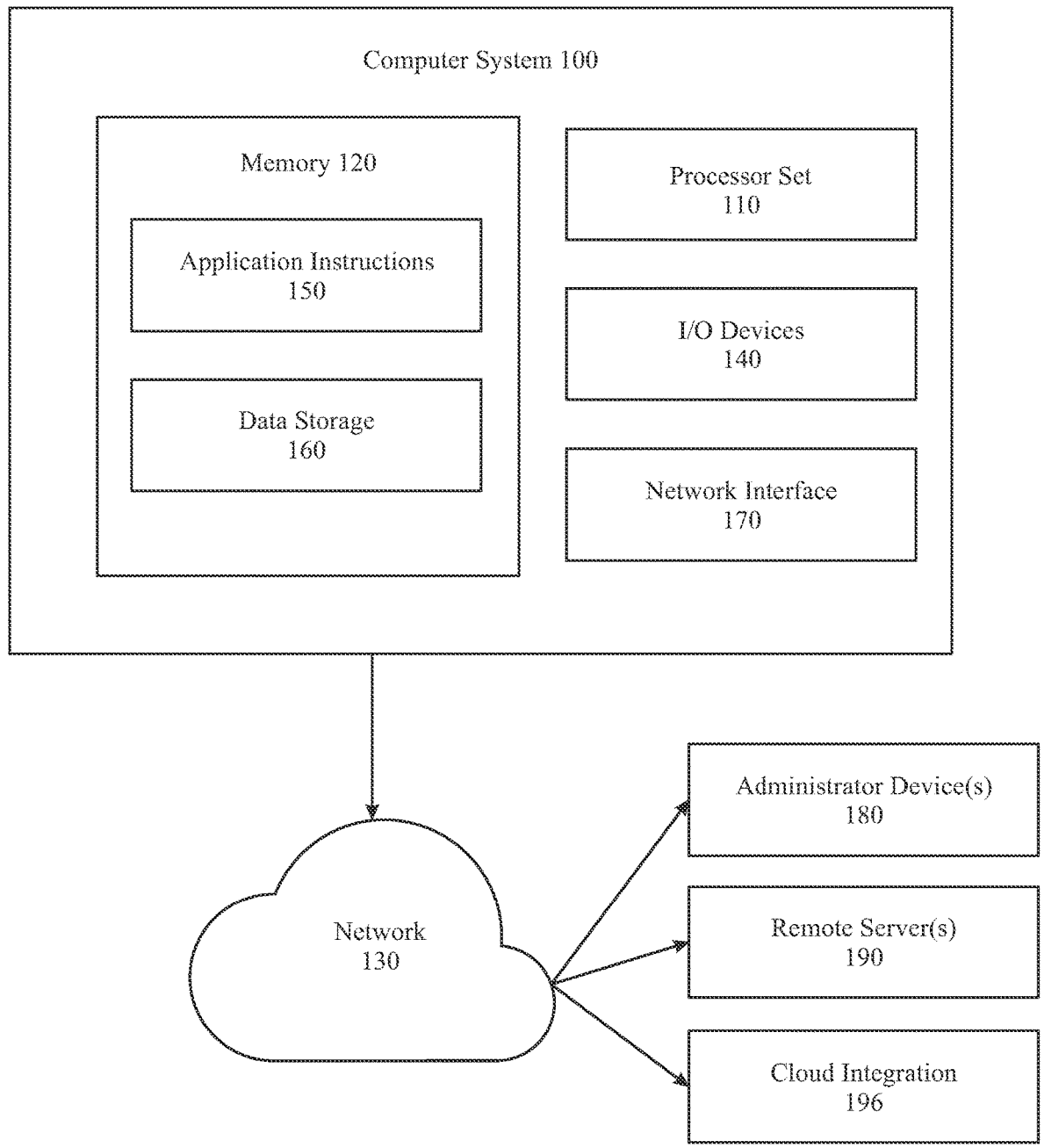
FIG. 1 illustrates a block diagram of a computing system implementing the disclosed computer program product, according to some embodiments described herein.

The drawings are illustrative depictions. The drawings are not necessarily to scale, and certain features and certain views of the drawings may be shown exaggerated in scale or in schematic in the interest of clarity and conciseness and should not be considered limiting.

DETAILED DESCRIPTION OF ILLUSTRATIVE VARIATIONS

The following description of the variations is merely illustrative in nature and is in no way intended to limit the scope of the invention, its application, or uses.

Vehicles may be configured for autonomous driving functionality such as, but not limited to, driver assistance, partial driving automation, conditional driving automation, high driving automation, full driving automation, lane keep assist, park assist, adaptive cruise control, obstacle avoidance, and others.

A vehicle's steering system may also be autonomous in that the vehicle may propel, steer, or brake itself to approach a predetermined location that has been communicated to it with or without assistance or interference from a driver. The vehicle's steering system may have an obstacle avoidance system that allows the vehicle to sense objects in its path and avoid them. The vehicle's steering system may have a motion planner or trajectory planning system that allows the vehicle to plan vehicle path. In some cases, the driver of the vehicle may wish to assist the vehicle in avoiding an object, or to change direction, such as changing driving lanes, of the vehicle without first communicating that wish to the vehicle in some other manner. In such a case, the driver may take control of the driver-side steering system controls and assist the autonomous steering system.

Degrees of autonomous driving functionality may be achieved, at least, vehicle via sensors configured to capture, observe, measure, or calculate environmental data or vehicle data in conjunction with motion planning or trajectory planning. Vehicle sensors may include sensors associated with cargo or passenger vehicles such as, park assist sensors, blind spot detection sensors, surround sensors, collision warning sensors, traffic sign or signal recognition sensors, emergency brake, pedestrian detection, collision avoidance sensors, or cross traffic sensors. Vehicle sensors may include radar, lidar, cameras, global positions system (GPS), global navigation satellite systems (GNSS), environmental sensors, or the like. Vehicle sensors may perform a variety of functions with respect to detecting, reading, recognizing, or interpreting data associated with local surroundings, operating environment, and vehicle data.

During operation of a vehicle implementing an autonomous driving system such as lane-keeping functionality, a vehicle may drive along a relatively flat and straight stretch of road. During operation, the system may include a motion controller that may receive a trajectory path from a trajectory planner. Based on the trajectory path, the motion planner may calculate steering, propulsion, or braking actuation outputs required to achieve the trajectory path, including intermediate actuations, and may determine a physical model for prediction of the vehicle behavior given the planned actuations. The model may be used to generate trajectory boundaries of expected accelerations and rotations of the vehicle body at a given interval in the motion plan.

To achieve a desired trajectory, a motion controller may calculate a set of steering, propulsion, or braking actuation commands to follow the desired path over a predetermined period of time, such as the next few seconds. At the same time, the motion controller may predict a set of acceleration and rotational limits the vehicle will stay within at various points during an interval of time.

To keep all actuators within desired operational readiness, the choice of actuators used to maintain the requested trajectory may be constantly or routinely evaluated and adjusted.

When an electronic steering system includes a component such as, but not limited to, a powerpack or electric motor in a power steering system that have failed, or rack and pinion actuators or controllers in a steer by wire system that have failed, a brake-to-steer algorithm may be executed by an electronic processor to issue actuation commands to produce brake pressure requests communicated to individual wheels as a function of vehicle state information. The vehicle state information may include, for example, at least one of lateral acceleration or yaw rate, and if available, steering sensor measurements which may include, for example, at least one of torque or angle. Brake pressure requests may be calculated in such a way as to provide enough braking force on at least one roadwheel to generate a yaw torque, which in turn generates a lateral force that supplements the lateral force induced by the driver's manual steering, or substitutes steering forces generated by a steering command in a failed steering system for a steer by wire or autonomous vehicle. This may allow the vehicle to achieve higher yaw rate during a wide range of maneuvers, which may include but not limited to, an evasive maneuver that it would have otherwise not achieved with a failed electronic steering system. The method and brake-to-steer algorithm may reduce the required driver input force to improve controllability and safety, or may provide a means for lateral control for the driver or autonomous controller in a situation where there would ordinarily be none.

Steering wheel and vehicle state information may be used as an input to a brake-to-steer system while electronic power steering assist system has failed. The brake-to-steer system may be used to add additional yaw torque to the driver induced steering angle in the event of an evasive maneuver, thus helping the driver achieve higher yaw rates in an emergency avoidance maneuver while the electronic power steering assist system is not operational and not able to provide assist. Vehicle dynamic signals indicating the state of the vehicle's motion may be utilized, and steering sensor signals when available. Alternatively, the function could be achieved to enhance lateral response during evasive maneuvers when the electronic power assist system is operational, partially operational, or beginning to fail.

Brake temperature variance may impact brake torque generated by brakes during brake-to-steer. Vehicle lateral response may vary significantly with varying brake temperature. For example, relatively cold brake temperature may yield significantly less vehicle lateral response than higher brake temperatures during comparable lateral maneuvers. Brake pressure command generation that does not consider brake temperature may lead to inconsistent lateral response for a vehicle.

Brake-to-steer longitudinal powertrain compensation depends directly on a brake pressure to torque coefficient, which may vary significantly with brake temperature. Consequently, powertrain compensation commands may be excessive or insufficient during brake-to-steer without the use of real-time temperature feedback to alter brake pressure or powertrain commands.

Additionally, brake-to-steer itself may increase vehicle brake temperatures during application of vehicles brakes, and may unintentionally exceed a safe operating temperature.

According to some illustrative variations, brake-to-steer lateral control may be improved by altering brake-to-steer commands to achieve similar brake torques at varying brake temperatures. For example, brake pressure commands may be modified via a temperature-dependent scalar determined based on temperature inputs measured or estimated by vehicle's onboard computer system(s).

According to some illustrative variations, brake-to-steer longitudinal control may be improved by allowing brake pressure to torque coefficient to vary with input brake temperature as measured by vehicle onboard computer system(s).

According to some illustrative variations, brake-to-steer lateral or longitudinal control may be improved by preventing brake hardware from exceeding safe operating temperature ranges. Brake-to-steer commands may be modified or halted to limit heat generation during brake usage.

According to some illustrative variations, a method or computer program product for temperature dependent enhancement during brake-to-steer may include receiving temperature estimates or measurements from a vehicle braking system and altering brake-to-steer actuation commands to reduce excess heat generation during brake usage.

Brake temperature estimates and measurements may be obtained from measurements of brake pad temperature, brake disc temperature, brake fluid temperature, or calculated or estimated from brake pressure apply time, brake force apply time, or wheel deceleration or vehicle deceleration, via on board temperature sensors or computed estimations.

The disclosed method or computer program product for temperature dependent enhancement during brake-to-steer may alter brake-to-steer brake commands to achieve similar brake torques at different brake temperatures. This may be accomplished by scaling the brake pressure commands by a temperature-dependent scalar via a one-dimensional (1-D) lookup table with calibrations set after empirical testing with vehicle dynamics modeling. This scalar may be multiplied with the calculated brake-to-steer brake commands prior to sending the commands to a brake module or electronic braking control unit.

Existing brake-to-steer longitudinal powertrain compensation may assume a constant brake pressure to torque coefficient. According to the present disclosure, brake temperature inputs allow the use of a temperature dependent brake pressure to torque coefficient so that a constant brake pressure to torque coefficient is not assumed. This allows the powertrain compensation calculation to be calculated more accurately. This can be done by multiplying a temperature dependent scalar to the calculated powertrain command. This function will enhance brake-to-steer longitudinal compensation consistency and accuracy by calculating the brake-to-steer commands using more accurate parameters, which will improve controllability for the driver.

The disclosed method or computer program product for temperature dependent enhancement during brake-to-steer may alter brake-to-steer brake commands to prevent brake-to-steer from causing the brake hardware to exceed a safe temperature range. The disclosed method or computer program product uses high temperature limits for the brake system, above which the commanded brake pressures will be reduced or eliminated, so that the brakes will generate less heat or cool. The disclosed method or computer program product also uses low temperature thresholds to allow brake pressures to be recovered once the brakes have cooled sufficiently.

The disclosed method or computer program product for temperature dependent enhancement during brake-to-steer may generate a brake temperature estimation model inside the brake-to-steer software based on brake-to-steer brake commands. The brake temperature estimation model may provide a diverse and redundant brake temperature estimation to further inform modification of brake commands to stay within target brake system target temperatures.

Referring to FIG. 1, a computer system 100 may include memory 120, a processor 110, input/output devices 140, and a network interface 170 constructed and arranged to facilitate communication with a network 130. The computer system 100 may be any of an electronic brake control unit, electronic steering control unit, electronic propulsion control unit, or electronic control unit(s) (ECU) used in a vehicle. The computer system may also be an engine control module, brake control module, transmission control module, telematic control module, suspension control module, or any other vehicle modules configured for electronically controlling features within a vehicle. The memory 120 may include computer-readable application instructions 150, configured to implement certain embodiments described herein, and a database 160, comprising various data accessible by the application instructions 150. In some embodiments, the steps and actions of the application instructions 150 described herein are embodied directly in hardware, in a software program product executed by a processor, or in a combination of the two. A software program product may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the application instructions 150 for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The application instructions 150 can execute entirely on the vehicle's computer, partly on the vehicle's computer, as a stand-alone software package, or partly on the vehicle's computer and partly on a remote computer. In the latter scenario, the remote computer can be connected to the vehicle's computer through any type of network, including a controller area network (CAN), a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, to perform aspects of the present disclosure.

In some embodiments, the application instructions 150 can be downloaded to a computing/processing device from a computer readable storage medium, or to an external computer or external storage device via a network 130. A network adapter card or network interface in each computing/processing device may receive computer readable program instructions from the network and forwards the computer readable application instructions 150 for storage in a computer readable storage medium within the respective computing or processing device.

In some embodiments, the computer system 100 includes a network interface 170 to communicate with a network 130. In some embodiments, the network interface 170 is configured to allow data to be exchanged between the computer system 100 and other devices attached to the network 130, such as other computer systems, or between nodes of the computer system 100. In various embodiments, the network interface 170 may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network or protocol.

The network 130 may be configured to facilitate operable communication between the computer system 100 and any of administrator devices 180, remote servers 190 or remote computer systems, or cloud network integrations 196.

Figure 2:
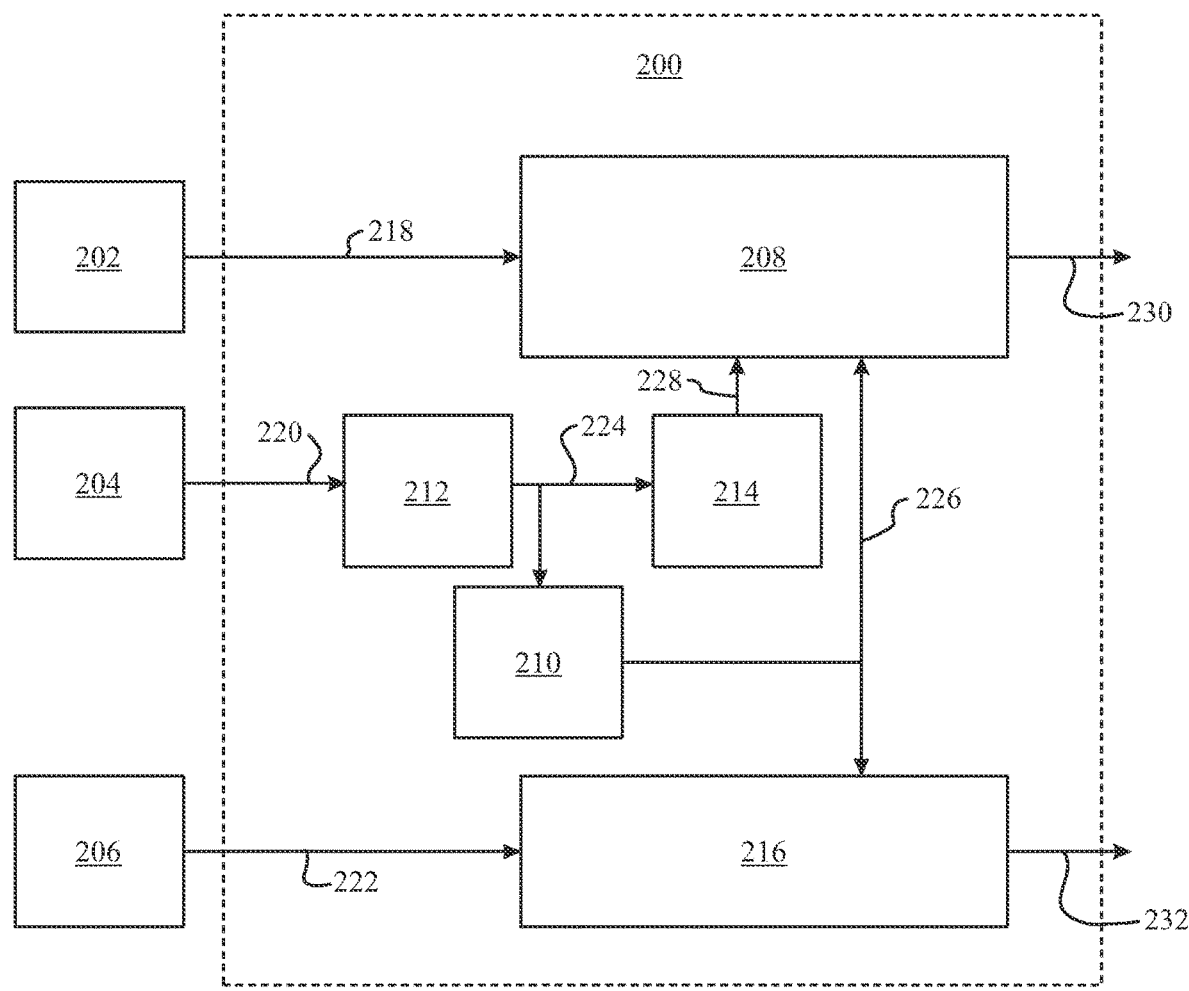
FIG. 2 depicts an illustrative variation of a computer program product implemented within a vehicle equipped with hardware sufficient for carrying out at least some of the products and methods described herein.

FIG. 2 depicts an illustrative variation of block diagram of a product and method of temperature dependent enhancement for brake-to-steer 200. A brake-to-steer brake command algorithm 202 may be configured to calculate a number of brake-to-steer brake commands 218 for any of the front left, front right, rear left, or rear right brake systems on a vehicle. Brake-to-steer brake commands 218 may be communicated to a brake-to-steer adjustment function 208.

Brake temperature inputs 204 may be communicated 220 to a brake-to-steer temperature arbitration function 212 and a brake pressure to torque scalar calculation function 210. Brake temperature inputs 204 may include, but are not limited to, brake pad temperature, brake disc temperature, brake fluid temperature, or estimates or calculations based on brake pressure apply time, brake force apply time, or wheel deceleration or vehicle deceleration, based on onboard temperature sensors or computed estimations. The brake-to-steer temperature arbitration function 212 may arbitrate brake temperature inputs 204 and communicated arbitrated brake temperature inputs 224 to a brake-to-steer brake derating logic function 214 and torque scalar calculation function 210. Arbitrating the input brake temperatures can do two main things. First, it determines which temperature source the algorithm uses. For example, if a brake temperature is received from a temperature sensor and is estimated by the brakes, we receive two values. The arbitration strategy could be to use the sensor measurement unless the sensor measurement in unavailable. If unavailable, the algorithm could arbitrate to use the estimated temperature value. Second, the algorithm's arbitrated brake temperature can be based on a combination of wheel brake temperatures. For example, if the rear right and rear left brake temperatures are received, the arbitration function can take the maximum of the two, and output a "rear" brake temperature that can be used to alter both rear wheel BTS commands. Other strategies could use the max of all 4 brake temperatures, for example.

The brake-to-steer brake derating logic function 214 may generate brake derating scalar(s) 228 which may be communicated to the brake-to-steer adjustment function 208. The brake-to-steer brake derating logic function 214 may generate brake derating scalar(s) 228 by implementing a derating strategy based on brake temperature inputs 204 or arbitrated brake temperature inputs 224 i.e., operating within temperature thresholds, which may be determined by the system, to reduce overheating of braking systems. The brake-to-steer brake derating logic function 214 may use high temperature limits for the brake system, above which the commanded brake pressures will be reduced or eliminated, so that the brakes will generate less heat or cool. The brake-to-steer brake derating logic function 214 may also use low temperature thresholds to allow brake pressures to be recovered once the brakes have cooled sufficiently.

The brake-to-steer adjustment function 208 may determine modified brake actuation commands 230 by combining or considering the brake-to-steer brake command(s) 218, the brake pressure to torque scalar(s) 226 and the brake derating scalar(s) 228. Modified brake actuation commands 230 may be applied during brake-to-steer functionality to reduce exceeding brake temperature threshold values.

Additionally, brake-to-steer powertrain (propulsion) commands 206 may be communicated 222 to a brake-to-steer powertrain adjustment function 216. The brake-to-steer powertrain adjustment function 216 may also receive brake pressure to torque scalar(s) 226 as computed by the torque scalar calculation function 210. The brake-to-steer powertrain adjustment function 216 may adjust brake-to-steer powertrain commands 206 based on temperature dependent brake pressure to torque scalar(s) 226 to generate scaled powertrain commands 232 to improve longitudinal control of the vehicle during Brake-To-Steer.

The following description of variants is only illustrative of components, elements, acts, product, and methods considered to be within the scope of the invention and are not in any way intended to limit such scope by what is specifically disclosed or not expressly set forth. The components, elements, acts, product, and methods as described herein may be combined and rearranged other than as expressly described herein and still are considered to be within the scope of the invention.

According to variation 1, a computer program product including instructions executable by an electronic processor to carry out the actions including the steps of determining at least one brake-to-steer brake command; communicating at least one brake temperature input to a brake-to-steer adjustment function and at least one brake pressure to torque scalar function; generating an arbitrated brake temperature data by arbitrating the at least one brake temperature input; generating at least one brake derating scalar based on arbitrated brake temperature data via a brake-to-steer brake derating logic function; generating at least one brake pressure to torque scalar based on the at least one brake temperature input; applying the at least one brake derating scalar and the at least one brake pressure to torque scalar to the at least one brake-to-steer brake command via a brake-to-steer brake derating logic function; and generating at least one modified brake-to-steer brake command.

Variation 2 may include a computer program product as in variation 1, wherein generating at least one modified brake-to-steer brake command includes multiplying the at least one brake-to-steer brake command by the at least one brake derating scalar and the at least one brake pressure to torque scalar.

Variation 3 may include a computer program product as in variation 1 or 2, further including applying the at least one modified brake-to-steer brake command to a vehicle braking system.

Variation 4 may include a computer program product as in any of variations 1 through 3, further including applying the at least one brake pressure to torque scalar to at least one brake-to-steer powertrain command via a brake-to-steer powertrain adjustment function; and generating at least one scaled powertrain command.

Variation 5 may include a computer program product as in any of variations 1 through 4, wherein generating at least one scaled powertrain command includes multiplying the at least one brake-to-steer powertrain command by one over the at least one brake pressure to torque scalar.

Variation 6 may include a computer program product as in any of variations 1 through 5, further including applying the at least one scaled powertrain command to a vehicle propulsion system.

Variation 7 may include a computer program product as in any of variations 1 through 6, wherein communicating at least one brake temperature input to the brake-to-steer adjustment function and at least one torque scalar calculation function includes measuring the at least one brake temperature input via at least one onboard vehicle sensor based on at least one of brake pad temperature, brake disc temperature, or brake fluid temperature, Variation 8 may include a computer program product as in any of variations 1 through 7, wherein communicating at least one brake temperature input to the brake-to-steer adjustment function and at least one torque scalar calculation function includes calculating the at least one brake temperature input via at least one of an onboard vehicle sensor or processor based on at least one of brake pressure apply time, brake force application time, wheel deceleration, or vehicle deceleration.

Variation 9 may include a computer program product as in any of variations 1 through 8, wherein the brake-to-steer brake commands include brake actuation commands for at least one of a front left wheel, front right wheel, rear left wheel, or rear right wheel brake systems on a vehicle.

According to variation 10, a method may include determining at least one brake-to-steer brake command; communicating at least one brake temperature input to a brake-to-steer adjustment function and at least one brake pressure to torque scalar function; generating an arbitrated brake temperature data by arbitrating the at least one brake temperature input; generating at least one brake derating scalar based on arbitrated brake temperature data via a brake-to-steer brake derating logic function; generating at least one brake pressure to torque scalar based on the at least one brake temperature input; applying the at least one brake derating scalar and the at least one brake pressure to torque scalar to the at least one brake-to-steer brake command via a brake-to-steer brake derating logic function; and generating at least one modified brake-to-steer brake command.

Variation 11 may include a method as in variation 10, wherein generating at least one modified brake-to-steer brake command includes multiplying the at least one brake-to-steer brake command by the at least one brake derating scalar and the at least one brake pressure to torque scalar.

Variation 12 may include a method as in variation 10 or 11, further including applying the at least one modified brake-to-steer brake command to a vehicle braking system.

Variation 13 may include a method as in any of variations 10 through 12, further including applying the at least one brake pressure to torque scalar to at least one brake-to-steer powertrain command via a brake-to-steer powertrain adjustment function; and generating at least one scaled powertrain command.

Variation 14 may include a method as in any of variations 10 through 13, wherein generating at least one scaled powertrain command includes multiplying the at least one brake-to-steer powertrain command by one over the at least one brake pressure to torque scalar.

Variation 15 may include a method as in any of variations 10 through 14, further including applying the at least one scaled powertrain command to a vehicle propulsion system.

Variation 16 may include a method as in any of variations 10 through 15, wherein communicating at least one brake temperature input to the brake-to-steer adjustment function and at least one torque scalar calculation function includes measuring the at least one brake temperature input via at least one onboard vehicle sensor based on at least one of brake pad temperature, brake disc temperature, or brake fluid temperature.

Variation 17 may include a method as in any of variations 10 through 16, wherein communicating at least one brake temperature input to the brake-to-steer adjustment function and at least one torque scalar calculation function includes calculating the at least one brake temperature input via at least one of an onboard vehicle sensor or processor based on at least one of brake pressure apply time, brake force application time, wheel deceleration, or vehicle deceleration.

Variation 18 may include a method as in any of variations 10 through 17, wherein the brake-to-steer brake commands include brake actuation commands for at least one of a front left wheel, front right wheel, rear left wheel, or rear right wheel brake systems on a vehicle.

According to variation 19, a computer program product including instructions executable by an electronic processor to carry out the actions may include the steps of determining at least one brake-to-steer brake command; communicating at least one brake temperature input to a brake-to-steer adjustment function and at least one brake pressure to torque scalar function; generating an arbitrated brake temperature data by arbitrating the at least one brake temperature input; generating at least one brake derating scalar based on arbitrated brake temperature data via a brake-to-steer brake derating logic function; generating at least one brake pressure to torque scalar based on the at least one brake temperature input; applying the at least one brake derating scalar and the at least one brake pressure to torque scalar to the at least one brake-to-steer brake command via a brake-to-steer brake derating logic function; generating at least one modified brake-to-steer brake command including multiplying the at least one brake-to-steer brake command by the at least one brake derating scalar and the at least one brake pressure to torque scalar; applying the at least one modified brake-to-steer brake command to a vehicle braking system; applying the at least one brake pressure to torque scalar to at least one brake-to-steer powertrain command via a brake-to-steer powertrain adjustment function; generating at least one scaled powertrain command including multiplying the at least one brake-to-steer powertrain command by one over the at least one brake pressure to torque scalar; and applying the at least one scaled powertrain command to a vehicle propulsion system.

The above description of select variations within the scope of the invention is merely illustrative in nature and, thus, variations or variants thereof are not to be regarded as a departure from the spirit and scope of the invention.

What is claimed is:

1. A computer program product comprising instructions executable by an electronic processor to carry out actions, comprising:
   determining at least one brake-to-steer brake command;
   communicating at least one brake temperature input to a brake-to-steer adjustment function and at least one brake pressure to torque scalar function;
   generating an arbitrated brake temperature data by arbitrating the at least two brake temperature inputs;
   generating at least one brake derating scalar based on arbitrated brake temperature data via a brake-to-steer brake derating logic function;
   generating at least one brake pressure to torque scalar based on the at least one brake temperature input;
   applying the at least one brake derating scalar and the at least one brake pressure to torque scalar to the at least one brake-to-steer brake command via a brake-to-steer brake derating logic function; and
   generating at least one modified brake-to-steer brake command.

2. A computer program product as in claim 1, wherein generating at least one modified brake-to-steer brake command comprises multiplying the at least one brake-to-steer brake command by the at least one brake derating scalar and the at least one brake pressure to torque scalar.

3. A computer program product as in claim 1, further comprising applying the at least one modified brake-to-steer brake command to a vehicle braking system, wherein the at least two brake temperature inputs comprises an input from a sensor and an input from an estimated temperature.

4. A computer program product as in claim 1, wherein communicating at least one brake temperature input to the brake-to-steer adjustment function and at least one torque scalar calculation function comprises:
   measuring the at least one brake temperature input via at least one onboard vehicle sensor based on at least one of brake pad temperature, brake disc temperature, or brake fluid temperature.

5. A computer program product as in claim 1, wherein communicating at least one brake temperature input to the brake-to-steer adjustment function and at least one torque scalar calculation function comprises:
   calculating the at least one brake temperature input via at least one of an onboard vehicle sensor or processor based on at least one of brake pressure apply time, brake force application time, wheel deceleration, or vehicle deceleration.

6. A computer program product as in claim 1, wherein the brake-to-steer brake commands comprise brake actuation commands for at least one of a front left wheel, front right wheel, rear left wheel, or rear right wheel brake systems on a vehicle.

7. A computer program product comprising instructions executable by an electronic processor to carry out actions, comprising:
   determining at least one brake-to-steer brake command;
   communicating at least one brake temperature input to a brake-to-steer adjustment function and at least one brake pressure to torque scalar function;
   generating an arbitrated brake temperature data by arbitrating the at least one brake temperature input;
   generating at least one brake derating scalar based on arbitrated brake temperature data via a brake-to-steer brake derating logic function;
   generating at least one brake pressure to torque scalar based on the at least one brake temperature input;
   applying the at least one brake derating scalar and the at least one brake pressure to torque scalar to the at least one brake-to-steer brake command via a brake-to-steer brake derating logic function; and
   generating at least one modified brake-to-steer brake command, and further comprising:
   applying the at least one brake pressure to torque scalar to at least one brake-to-steer powertrain command via a brake-to-steer powertrain adjustment function; and
   generating at least one scaled powertrain command.

8. A computer program product as in claim 7, wherein generating at least one scaled powertrain command comprises multiplying the at least one brake-to-steer powertrain command by one over the at least one brake pressure to torque scalar.

9. A computer program product as in claim 8, further comprising applying the at least one scaled powertrain command to a vehicle propulsion system.

10. A method comprising:
determining at least one brake-to-steer brake command;
communicating at least one brake temperature input to a brake-to-steer adjustment function and at least one brake pressure to torque scalar function;
generating an arbitrated brake temperature data by arbitrating the at least two brake temperature inputs;
generating at least one brake derating scalar based on arbitrated brake temperature data via a brake-to-steer brake derating logic function;
generating at least one brake pressure to torque scalar based on the at least one brake temperature input;
applying the at least one brake derating scalar and the at least one brake pressure to torque scalar to the at least one brake-to-steer brake command via a brake-to-steer brake derating logic function; and
generating at least one modified brake-to-steer brake command.

11. A method as in claim 10, wherein generating at least one modified brake-to-steer brake command comprises multiplying the at least one brake-to-steer brake command by the at least one brake derating scalar and the at least one brake pressure to torque scalar.

12. A method as in claim 10, further comprising applying the at least one modified brake-to-steer brake command to a vehicle braking system, wherein the at least two brake temperature inputs comprises an input from a sensor and an input from an estimated temperature.

13. A method as in claim 10, wherein communicating at least one brake temperature input to the brake-to-steer adjustment function and at least one torque scalar calculation function comprises:
measuring the at least one brake temperature input via at least one onboard vehicle sensor based on at least one of brake pad temperature, brake disc temperature, or brake fluid temperature.

14. A method as in claim 10, wherein communicating at least one brake temperature input to the brake-to-steer adjustment function and at least one torque scalar calculation function comprises:
calculating the at least one brake temperature input via at least one of an onboard vehicle sensor or processor based on at least one of brake pressure apply time, brake force application time, wheel deceleration, or vehicle deceleration.

15. A method as in claim 10, wherein the brake-to-steer brake commands comprise brake actuation commands for at least one of a front left wheel, front right wheel, rear left wheel, or rear right wheel brake systems on a vehicle.

16. A method comprising:
determining at least one brake-to-steer brake command;
communicating at least one brake temperature input to a brake-to-steer adjustment function and at least one brake pressure to torque scalar function;
generating an arbitrated brake temperature data by arbitrating the at least one brake temperature input;
generating at least one brake derating scalar based on arbitrated brake temperature data via a brake-to-steer brake derating logic function;
generating at least one brake pressure to torque scalar based on the at least one brake temperature input;
applying the at least one brake derating scalar and the at least one brake pressure to torque scalar to the at least one brake-to-steer brake command via a brake-to-steer brake derating logic function; and
generating at least one modified brake-to-steer brake command, and further comprising:
applying the at least one brake pressure to torque scalar to at least one brake-to-steer powertrain command via a brake-to-steer powertrain adjustment function; and
generating at least one scaled powertrain command.

17. A method as in claim 16, wherein generating at least one scaled powertrain command comprises multiplying the at least one brake-to-steer powertrain command by one over the at least one brake pressure to torque scalar.

18. A method as in claim 17, further comprising applying the at least one scaled powertrain command to a vehicle propulsion system.

19. A computer program product comprising instructions executable by an electronic processor to carry out actions, comprising:
determining at least one brake-to-steer brake command;
communicating at least one brake temperature input to a brake-to-steer adjustment function and at least one brake pressure to torque scalar function;
generating an arbitrated brake temperature data by arbitrating the at least one brake temperature input;
generating at least one brake derating scalar based on arbitrated brake temperature data via a brake-to-steer brake derating logic function;
generating at least one brake pressure to torque scalar based on the at least one brake temperature input;
applying the at least one brake derating scalar and the at least one brake pressure to torque scalar to the at least one brake-to-steer brake command via a brake-to-steer brake derating logic function;
generating at least one modified brake-to-steer brake command comprising multiplying the at least one brake-to-steer brake command by the at least one brake derating scalar and the at least one brake pressure to torque scalar;
applying the at least one modified brake-to-steer brake command to a vehicle braking system;
applying the at least one brake pressure to torque scalar to at least one brake-to-steer powertrain command via a brake-to-steer powertrain adjustment function;
generating at least one scaled powertrain command comprising multiplying the at least one brake-to-steer powertrain command by one over the at least one brake pressure to torque scalar; and
applying the at least one scaled powertrain command to a vehicle propulsion system.

20. A computer program product comprising instructions executable by an electronic processor to carry out actions, comprising:
determining at least one brake-to-steer brake command;
communicating at least one brake temperature input to a brake-to-steer adjustment function and at least one brake pressure to torque scalar function;
generating an arbitrated brake temperature data by arbitrating the at least one brake temperature input;
generating at least one brake derating scalar based on arbitrated brake temperature data via a brake-to-steer brake derating logic function;
generating at least one brake pressure to torque scalar based on the at least one brake temperature input;
applying the at least one brake derating scalar and the at least one brake pressure to torque scalar to the at least one brake-to-steer brake command via a brake-to-steer brake derating logic function;

generating at least one modified brake-to-steer brake command; and stopping the generating at least one modified brake-to-steer brake command when the arbitrated brake temperature data is at or above an upper threshold; and resuming the generating at least one modified brake-to-steer brake command when the arbitrated brake temperature data is at or below a lower threshold.

* * * * *